United States Patent
Fennel

(10) Patent No.: US 6,409,286 B1
(45) Date of Patent: Jun. 25, 2002

(54) METHOD AND BRAKING SYSTEM FOR REGULATING THE DRIVING STABILITY OF A MOTOR VEHICLE

(75) Inventor: Helmut Fennel, Bad Soden (DE)

(73) Assignee: Continential Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/582,751

(22) PCT Filed: Dec. 21, 1998

(86) PCT No.: PCT/EP98/08355

§ 371 (c)(1),
(2), (4) Date: Sep. 27, 2000

(87) PCT Pub. No.: WO99/35016

PCT Pub. Date: Jul. 15, 1999

(30) Foreign Application Priority Data

Dec. 30, 1997 (DE) .......................................... 197 58 074

(51) Int. Cl.[7] ................................................. B60T 8/24
(52) U.S. Cl. .................... 303/140; 303/115.4; 303/156; 180/197; 701/78; 701/83
(58) Field of Search ................................. 303/140, 146, 303/147, 155, 156, 157, 158, 115.4, 115.5, 116.4; 180/197; 701/70, 71, 72, 78, 83

(56) References Cited

U.S. PATENT DOCUMENTS

| | | | | |
|---|---|---|---|---|
| 4,701,855 A | * | 10/1987 | Fennel | 180/197 X |
| 4,729,608 A | * | 3/1988 | Fennel et al. | 180/197 X |
| 5,270,933 A | * | 12/1993 | Fennel et al. | 180/197 X |
| 5,332,300 A | * | 7/1994 | Hartmann et al. | 180/197 X |
| 5,691,900 A | | 11/1997 | Luckevich | |
| 5,722,743 A | * | 3/1998 | Sano | 303/146 |
| 5,797,663 A | * | 8/1998 | Kawaguchi et al. | 303/146 |

FOREIGN PATENT DOCUMENTS

| | | |
|---|---|---|
| DE | 43 17 790 | 12/1994 |
| DE | 196 26 406 | 1/1997 |

\* cited by examiner

*Primary Examiner*—Pam Rodriguez
(74) *Attorney, Agent, or Firm*—Rader, Fishman & Grauer PLLC

(57) ABSTRACT

The present invention relates to a method of improving the control , behavior of an electronically regulated and/or controlled driving stability control system, wherein input quantities for the control are derived from the rotational behavior of the wheels and wherein in situations which are critical for driving stability, the driving stability is increased by braking pressure introduction and/or braking pressure modulation. In order to obviate the need for a precharging pump, the present invention proposes that criteria for evaluation of the driving situation and for the early detection of a driving situation inhering an increased risk are derived from the rotational behavior of the wheels, and that the commencement of driving stability control is prepared upon detection of a driving situation inhering an increased risk. A brake system for implementing the method is also an object of the present invention.

12 Claims, 2 Drawing Sheets

METHOD AND BRAKING SYSTEM FOR REGULATING THE DRIVING STABILITY OF A MOTOR VEHICLE

TECHNICAL FIELD

The present invention relates to a vehicle control system and more particularly relates to a method for improving the control behavior of an electronically regulated and/or controlled driving stability control system. A brake system for implementing the method is also an object of the present invention.

BACKGROUND OF THE INVENTION

German published application DE 373 1 756 A1, for example, discloses a method for controlling the driving stability of an automotive vehicle. In this method for controlling the driving stability of an automotive vehicle, a variation of the limit values of the yaw velocity, which is influenced additionally by the vehicle speed and the coefficient of friction, is evaluated in dependence on the steering angle. Based on this variation of limit values, criteria are defined which initiate braking pressure introduction and/or braking pressure modulation.

Precharging is necessary in the prior art methods of controlling the- driving stability of an automotive vehicle in order to achieve a satisfactory system dynamics, especially at low temperatures. This precharging function is performed, for example, by an electrically operable (active) brake force booster or a hydraulic precharging pump. Because the viscosity of the brake fluid rises at low temperatures, this measure is necessary in order to ensure a reliable and constant application of the method for controlling the driving stability of an automotive vehicle event at low temperatures.

Therefore, an object of the present invention is to improve upon a method for controlling the driving stability of a vehicle of the above-mentioned type to the end of obviating the need for precharging. Operability, even at low temperatures, shall be ensured without restrictions nonetheless. Another object of the present invention is to provide a brake system to implement the method for controlling driving stability.

This object is achieved by the present invention in that criteria for evaluation of the driving situation and for the early detection of a driving situation inhering an increased risk are derived from the rotational behavior of the wheels, and in that the commencement of driving stability control is prepared upon detection of a driving situation inhering an increased risk. Evaluating and deriving criteria of a driving situation due to the wheel rotational behavior may take place with a remarkable time advantage compared to the usually employed sensors, such as a yaw rate sensor or a transverse acceleration sensor because the reaction of the vehicle chassis to driving maneuvers and driving situations is sensed by the sensors. In comparison thereto, the reaction of the vehicle wheels is available at a much earlier point of time, and the considerably shorter time constant is decisive for a possibly following control action.

In a preferred embodiment of the present invention, criteria for evaluating the driving situation can be defined by recognition of differences in the rotational behavior of the individual wheels. The early detection of a driving situation inhering an increased risk by way of detecting differences in the rotational behavior of the individual wheels permits utilizing another criterion. In addition, a threshold of intervention may be derived from the criteria found. This is e.g. possible by a computer-assisted further processing operation on the basis of predetermined fixed or variable models of the wheel rotational speeds determined by the wheel rotational speed sensors.

Advantageously, the commencement of driving stability control is prepared when the intervention threshold is exceeded. A signal for the commencement of driving stability control may be transmitted from a computer which computes the intervention thresholds to the controller electronics and/or controller hydraulics by way of a suitable interface.

When the intervention threshold is exceeded, pressure increase in a hydraulic brake system can be prepared. This may be carried out by switching on a hydraulic pump, for example, which is already provided in a brake system of this type in most cases.

A preferred embodiment of a brake system for implementing the method of controlling the driving stability of an automotive vehicle may include hydraulically operated wheel brakes and a hydraulic pump with a clocked actuation.

The clock frequency of the hydraulic pump may favorably be increased when the intervention threshold is exceeded. This permits a softer control which is advisable for comfort reasons.

Further details and advantages of the present invention can be taken from the following description and the illustrations of a preferred embodiment of the method for controlling the driving stability of an automotive vehicle according to the present invention.

DETAILED DESCRIPTION OF THE PREFERRED EMBODIMENTS

Figure 1:
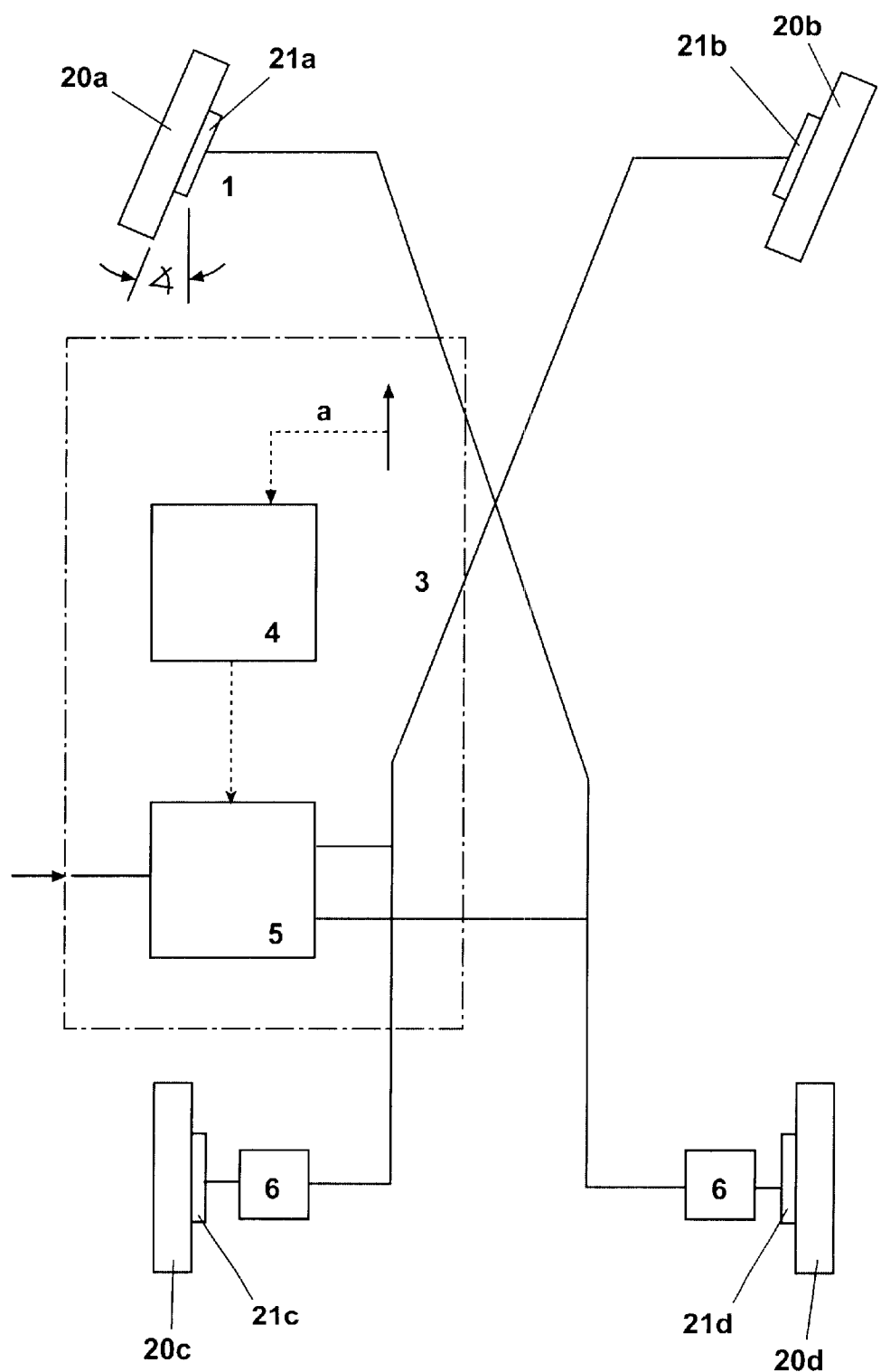
FIG. 1 shows a brake system control and method of the present invention for controlling the driving stability of an automotive vehicle during cornering.

The embodiment of FIG. 1 shows a configuration of a system for controlling the driving stability of an automotive vehicle. A pickup 2 for measuring data for the vehicle acceleration in the longitudinal direction, as indicated by the arrow, is arranged in the point of gravity of a vehicle. Mounted on the four wheels 20 a,b,c,d of the vehicle are sensors 21 a,b,c,d to take up the respective wheel rotational speeds. Corrective signals for a pressure modulator 5 are calculated by linking in a switch unit 4 on a microprocessor basis. Pressure modulator 5 which is e.g. the hydraulic pump of an ABS system can change the pressure in both brake circuits synchronously. According to the series equipment of the vehicle, there may be provision of devices which adjust an appropriate braking pressure ratio between the front axle and the rear axle. For example, such devices may be one or two load-responsive braking pressure reducing valves 6. It is advantageous in this arrangement that the complete system 3 can be combined in a block which may replace an already available brake force booster, without necessitating further modifications to the brake system.

Cornering detection is performed and the respective driving situation analyzed on the basis of the evaluation of wheel sensor signals. Upon the occurrence of certain defined combinations of wheel rotational speeds, the pressure modulator 5 is actuated, and a slight pressure increase will occur already in the braking cycle. The controller will then wait for a pressure increase pulse of a fixed or variable length until the derivative of the filtered vehicle acceleration adopts a minimum value (negative). Now a limit value is calculated from the measured magnitude of the abrupt change in pressure, and the derivative of the filtered vehicle acceleration must fall below the said limit value in order to permit a continued pressure increase and pressure increase pulse. This alternation between pressure increase and pressure maintenance is repeated until the vehicle deceleration has increased only little after the pressure increase pulse. One may assume that several wheels are in the range of the maximum of the slip curve or have already exceeded the maximum.

It can be determined to a certain degree by selecting the limit whether locking of one or more wheels is accepted. When the values have not fallen below the lower limit for the derivative of the filtered vehicle acceleration after a pressure increase pulse, the controller will reduce the pressure, in order to increase the cornering force, until it has basically been ensured that the wheels move in the stable range of the slip curve. This is recognized by a sudden, major reduction in the vehicle deceleration, that means, the derivative of the filtered vehicle acceleration exceeds a predetermined upper limit. It is now possible to reincrease the pressure instantaneously, and the entire process is repeated.

Figure 2:
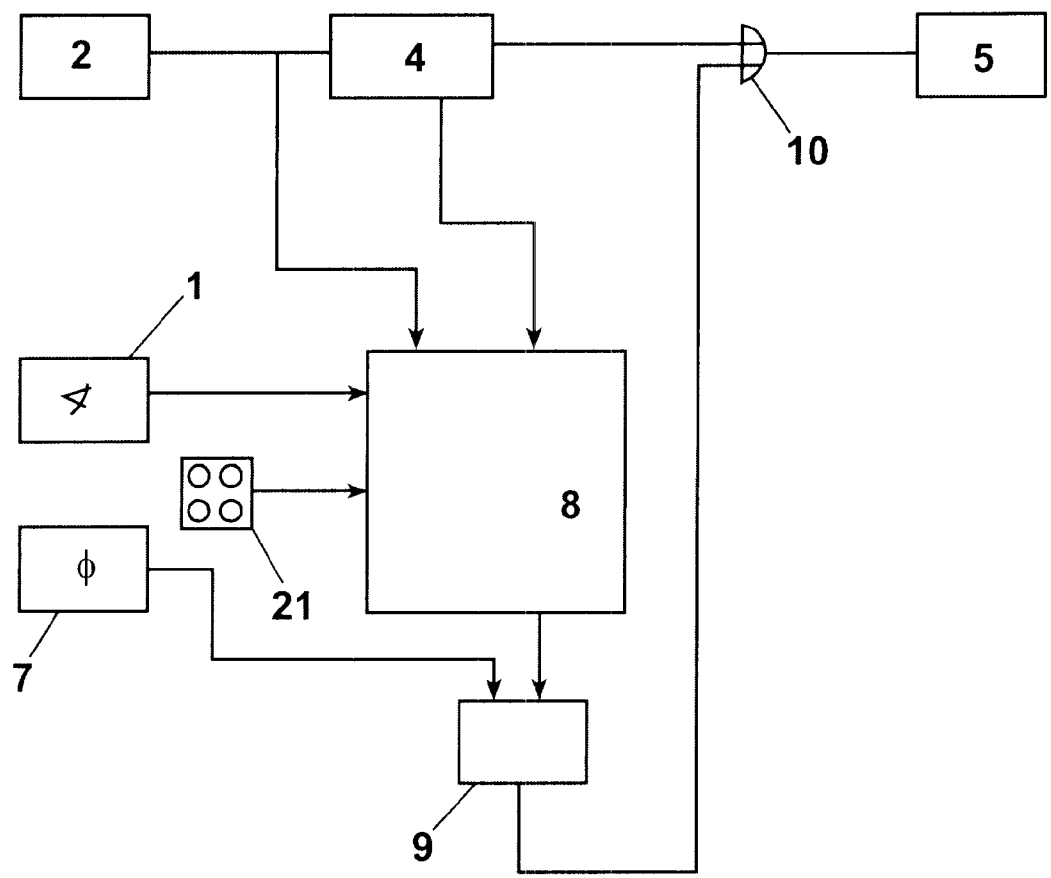
FIG. 2 shows a block diagram of an exemplary control system.

The embodiment of FIG. 2 illustrates the controller electronics of FIG. 1 once more. However, the superior controller is shown in addition which is comprised of a steering angle generator 1, a measuring data emitter 7 for the yaw velocity, a measuring data emitter 21 for the wheel rotational speeds, an evaluating circuit 8, and a comparator 9.

Beside the signals of the steering angle generator 1, the measuring data emitter for the yaw velocity 7, and the sensors 21 a,b,c,d, the vehicle deceleration signal of the pickup 2 and a quantity representative of the vehicle speed is sent to the evaluating circuit 8. The existing coefficient of friction is estimated by means of the maximum vehicle deceleration in the evaluating circuit 8.

The variations of limit values for the yaw velocity as a function of the steering angle are calculated from the measured values in the evaluating circuit 8, and the steering angle and the resulting yaw velocity are referred to as positive or negative depending on the steering direction.

If the yaw velocity, at a defined steering angle in consideration of the prevailing vehicle speed, will not reach the magnitude defined by the variation of limit values, pressure is decreased in order to achieve a higher yaw velocity. This increases the cornering force and the yaw velocity. The comparison between the measured yaw velocity and the calculated limit value which is necessary for this purpose is carried out in comparator 9 which then issues a reduction signal to the braking pressure control device 5 by way of an OR gate 10. A threshold is provided as an upper comparison value. If this threshold is exceeded by the measured yaw velocity, pressure is increased in order to avoid oversteering.

What is claimed is:

1. A method for controlling driving stability of an automotive vehicle, comprising the steps of:
   determining a steering angle, a rotational behavior of individual wheels, a vehicle yaw velocity, a vehicle forward speed, and a coefficient of friction between tires and road;
   determining an intervention threshold based on differences in the rotational behavior of individual wheels;
   adjusting brake pressure by use of a hydraulic pump having a clocked actuation to vary the vehicle yaw velocity toward the intervention threshold by one of increasing or decreasing brake pressure,
   whereby a clock frequency for driving the hydraulic pump is increased when the intervention threshold is exceeded.

2. The method as claimed in claim 1, wherein the brake pressure is increased when the vehicle yaw velocity exceeds the intervention threshold.

3. The method as claimed in claim 1, wherein the brake pressure is decreased when the vehicle yaw velocity does not exceed the intervention threshold.

4. The method as claimed in claim 1, wherein the steering angle and the vehicle forward speed are considered when determining whether the vehicle yaw velocity exceeds the intervention threshold.

5. A method for controlling driving stability of an automotive vehicle, comprising the steps of:
   determining a steering angle, a rotational behavior of individual wheels, a vehicle yaw velocity, a vehicle forward speed, and a coefficient of friction between tires and road;
   determining an intervention threshold based on differences in the rotational behavior of individual wheels;
   issuing a signal to commence driving stability control when the intervention threshold is exceeded; and
   adjusting brake pressure by use of a hydraulic pump having a clocked actuation to vary the vehicle yaw velocity toward the intervention threshold by one of increasing or decreasing brake pressure,
   whereby a clock frequency for driving the hydraulic pump is increased when the intervention threshold is exceeded.

6. The method as claimed in claim 5, further comprising the step of increasing brake pressure when the signal is issued to commence driving stability control.

7. The method as claimed in claim 6, further comprising the step of decreasing the brake pressure when the intervention threshold is no longer exceeded.

8. The method as claimed in claim 5, wherein the steering angle and the vehicle forward speed are considered when determining whether the intervention threshold has been exceeded.

9. A brake system for controlling driving stability of an automotive vehicle, comprising:
   a controller comprising a steering angle generator for measuring a steering angle, a first measuring data emitter for measuring a yaw velocity, a second measuring data emitter for measuring wheel rotational speeds, an evaluating circuit for receiving signals of the steering angle, the yaw velocity and the wheel rotational speeds, the controller determining an intervention threshold based on the wheel rotational speeds, and a comparator for comparing the yaw velocity with the intervention threshold, and
   a hydraulic pump having a clocked actuation for adjusting brake pressure, a clock frequency for driving the hydraulic pump being increased when the intervention threshold is exceeded,
      wherein brake pressure is adjusted to vary the yaw velocity toward the intervention threshold by one of increasing or decreasing brake pressure.

10. The brake system as claimed in claim 9, wherein the brake pressure is increased when the yaw velocity exceeds the intervention threshold.

11. The brake system as claimed in claim 9, wherein the brake pressure is decreased when the vehicle yaw velocity does not exceed the intervention threshold.

12. The brake system as claimed in claim 9, wherein the steering angle and a vehicle forward speed are considered when determining whether the yaw velocity exceeds the intervention threshold.

* * * * *